United States Patent [19]

Stevens

[11] 4,390,452

[45] Jun. 28, 1983

[54] MICROPARTICLES WITH VISUAL IDENTIFYING MEANS

[75] Inventor: Edward J. Stevens, Lake Elmo, Minn.

[73] Assignee: Minnesota Mining & Manufacturing Company, St. Paul, Minn.

[21] Appl. No.: 67,931

[22] Filed: Aug. 20, 1979

[51] Int. Cl.$^3$ .......... G01N 33/22; B32B 3/00; C09K 3/00; C09F 3/02

[52] U.S. Cl. .......... 252/408.1; 149/2; 149/21; 252/301.36; 252/965; 436/56

[58] Field of Search .......... 252/408, 965, 408.1, 252/301.36; 149/2 T, 21; 436/56

[56] References Cited

U.S. PATENT DOCUMENTS

| Re. 29,334 | 8/1977 | Ryan et al. | 149/21 |
|---|---|---|---|
| 2,687,367 | 8/1954 | Burrin | 424/7 |
| 3,128,744 | 4/1964 | Jefferts et al. | 252/408 |
| 3,772,200 | 11/1973 | Livesay | 149/2 |
| 3,835,782 | 9/1974 | Griffith et al. | 149/21 |
| 3,861,886 | 1/1975 | Meloy | 252/408 |
| 3,897,284 | 7/1975 | Livesay | 149/2 |
| 3,967,990 | 7/1976 | Ryan et al. | 149/2 |
| 4,053,433 | 10/1977 | Lee | 252/408 |
| 4,131,064 | 12/1978 | Ryan et al. | 252/408 |
| 4,197,104 | 4/1980 | Krystyniak et al. | 252/408 |

FOREIGN PATENT DOCUMENTS 2651528 5/1977 Fed. Rep. of Germany ...... 252/408

Primary Examiner—Teddy S. Gron

[57] ABSTRACT

Micropartices encoded for retrospective identification of substances into which they are incorporated. The novel microparticles have flat surfaces bearing repetitive identifying indicia such as alphanumerics which can be visually interpreted under magnification. The indicia may provide only part or all of the code.

20 Claims, 1 Drawing Figure

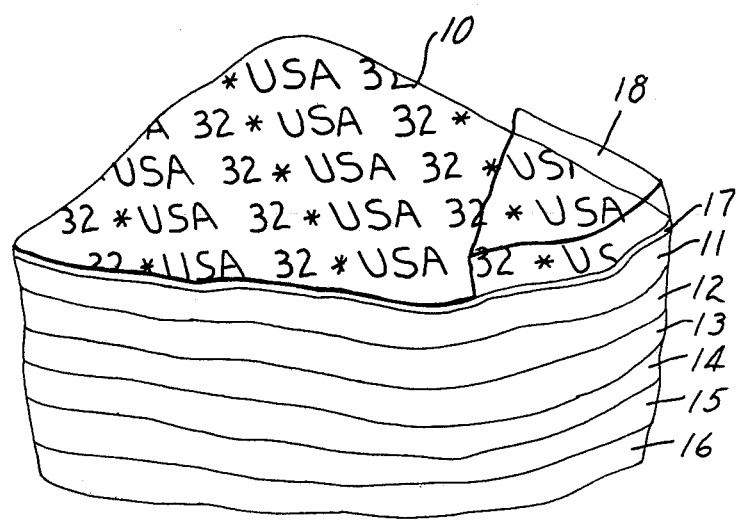

MICROPARTICLES WITH VISUAL IDENTIFYING MEANS

BACKGROUND OF THE INVENTION

There is great interest in tagging various substances such as explosives, petroleum products and drugs to enable retrospective identification. The most practical taggants are code-bearing microparticles which may be so small as to be virtually invisible to the naked eye. U.S. Pat. No. 3,772,200 describes such a microparticle containing tagging elements in various combinations and concentrations to provide codes which can be interpreted using an electron microprobe analyzer. U.S. Pat. No. 4,053,433 and German Offenlegungsschrift No. 26 51 528, laid open May 12, 1977, describe organic microparticles encoded by sequential arrangements of visually distinguishable colors. U.S. Pat. No. 3,772,099 describes microparticles in the form of conglomerations of selected combinations of line-emitting phosphors which can provide a large number of codes. Meloy U.S. Pat. No. 3,861,886 suggests encoding particles for retrospective identification by atomic absorption spectroscopy, emission spectroscopy, X-ray fluorescence analysis, neutron irradiation, activation analysis, etc.

If any one of these schemes is adopted worldwide, it may become necessary either to establish an international clearing house for the codes or to provide some means for determining which country is involved and where in that country information can be obtained converning the codes. In many cases there will be an urgent need for the immediate decoding, as where a law-enforcement agency wants information relating to an illicit use of an explosive.

OTHER PRIOR ART

The present invention makes use of exceedingly small photographic reproductions such as have been in use for at least forty years. At least that long ago sensitive information was transported surreptitiously by reducing a letter-size document into a "microdot" no larger than a typewritten period and physically hiding the microdot as the period of a personal communication.

THE PRESENT INVENTION

The present invention provides microparticles, each of which incorporates a code for retrospective identification. The novel microparticles differ from those of the aforementioned prior art in that each microparticle bears identifying indicia which provide a code that can be visually interpreted under magnification. The indicia may be alphanumerics or a symbol identifying the repository of decoding information, or both. The alphanumerics may include short abbreviations to identify the country, the manufacturer and its location, or a telephone number to be called to interpret the code. The indicia can provide the entire code or, if each particle incorporates a further code such as one of those mentioned above, only part of the code. If 34 alphanumeric characters are available, three characters provide 39,304 codes, five characters provide over 45 million codes and six characters provide over $1.5 \times 10^9$ codes.

A substance or object may be tagged with two or more differently encoded microtaggants, such as microparticles from one batch having indicia identifying the manufacturer and from another batch with indicia identifying individual units of production. For example, automotive paint might be tagged from one batch of particles indicating the factory and from another batch indicating the day or week of production. One batch of microparticles implanted within the hides of animals may indicate the owner and another, a biological treatment and might be implanted at different times.

Like the organic microparticles of the aforementioned Offenlegungsschrift No. 26 51 528, each batch of the organic microparticles of this invention is uniformly encoded for identification. Each microparticle is of the same thickness not significantly exceeding 500 micrometers and has two surfaces which are generally flat and parallel to each other. The other surfaces may have irregular shapes. The broadest dimension of most of the microparticles is no greater than 1000 micrometers, but greater than said thickness.

The novel microparticle differs from that of the Offenlegungsschrift in that at least one of its flat surfaces bears identifying indicia which are randomly located with respect to the edges of the microparticle. The indicia provide a repetitive code that can be visually interpreted under magnification and repeats in any direction within a distance less than the broadest dimension of most of the microparticles so that examination of a typical microparticle of average size should reveal the code. Preferably the code repeats in any direction within a distance approximating the thickness of the microparticles.

Each novel microparticle should have some characteristic strikingly different from its environment to enhance isolating it for visual examination of its identifying indicia. For example, it may contain magnetic material to permit magnetic separation and/or luminescent material to enhance visually locating it and moving it into the field of a microscope.

The microparticles of the present invention can be manufactured at reasonable cost by the steps of:

(1) making an organic sheet of substantially uniform thickness not significantly exceeding 500 micrometers, (2) forming on at least one face of the sheet identifying indicia which provide a repetitive code that can be visually interpreted under magnification and repeats in any direction within a distance not significantly exceeding 500 micrometers, and (3) comminuting the sheet at random into a batch of microparticles, each having two surfaces which are generally flat and parallel to each other and contain portions of said indicia, the broadest dimension of most of the microparticles being no greater than 1000 micrometers, but greater than said distance so that examination of a typical microparticle of average size should reveal said code.

For economy of manufacture, the organic sheet is made of a crosslinkable organic resin which is sufficiently flexible and resilient to form a wide sheet of good integrity and, after forming the identifying indicia, can be crosslinked to a brittle state and thus easily comminuted at ordinary room temperature into desirably small sizes. An organic sheet which is not sufficiently brittle to be readily comminuted at room temperature can be chilled until brittle. If this is impractical, the organic sheet can be fibrillated and the resultant fibers chopped to provide desirably small microparticles.

Indicia may be formed on a face of the organic sheet by applying a layer which contains a photo-sensitive material, exposing the photo-sensitive layer to radiant energy through a negative or positive of the desired indicia, and then developing and, if necessary, fixing the developed image. Another technique for forming the indicia is to create relief images of indicia and using these to emboss a face of the organic sheet, either after forming the sheet or during formation of the sheet, e.g., by forming the sheet in a mold containing indicia in either cameo or intaglio. Even though there may be no color contrast between the embossed indicia and the background surface of the resultant microparticle, the indicia can be easily interpreted in the sidelighting or annular lighting of a conventional microscope. A metal vapor coating may be applied to the face of the organic sheet, either before or after it is embossed.

The indicia may be formed on both faces of the organic sheet so that the indicia can be interpreted under magnification of a typical microparticle without substantially turning the microparticle. If desired, a clear layer of material may be applied over the indicia as a protective layer, especially if the microparticles are to be used for retrospective identification of an explosive after its detonation.

The organic sheet may be formed on a flexible carrier having a low-adhesion surface and should have sufficient stiffness and strength so that the carrier can be cleanly peeled away. In order to build the sheet to a uniform thickness having such stiffness and strength, usually at least 50 micrometers, it may be desirable to sequentially apply a number of layers. If the layers are of visually distinguishable colors, the resultant microparticles inherently are color-encoded as in the aforementioned Offenlegungsschrift No. 26 51 528 and may differ from those of the Offenlegungsschrift only in that each microparticle bears identifying indicia on one or both of its generally flat surfaces.

THE DRAWING

In the drawing, the single figure is a perspective view of a microparticle of the invention.

The microparticle has two flat, parallel surfaces, one of which 10 is shown. The other surfaces have irregular shapes at the edges of six visually distinguishable colored layers, 11, 12, 13, 14, 15 and 16. The flat surface 10 has repetitive identifying indicia formed in a very thin layer 17, e.g., by a diazo process. "USA" may indicate the country, "32" may indicate the factory and the "*" may indicate that the product is approved for use in a certain usage, e.g., an explosive suitable for use in an underground mine. A transparent layer 18 (broken away) may protect the indicia.

In the following examples, all parts are by weight.

EXAMPLE 1

A 7-layer organic sheet was made as in the aforementioned German Offenlegungsschrift No. 26 51 528 using a resin base prepared by mixing together 25 parts of a 50% solids soya alkyd resin in xylene (Aroplaz 6006×50), 25 parts of a 55% solids alkylated melamine resin in butanol and xylene (Cymel 248-8), and 0.3 part of 40% para-toluene sulfonic acid in isopropanol (Cyzac 4040). Individual portions of the resin base were pigmented and coated onto a release-paper carrier using a wire-wound rod (#20 Mayer bar) to provide about a 25-micrometer wet coat thickness per layer. After each coating was applied, it was dried for 3 minutes at 120° C. The color sequence was black-white-red-white-red-white-fluorescent green.

Over the fluorescent green layer was applied a clear (unpigmented) coating of the base resin except containing about 5 part by weight of the 40% para-toluene sulfonic acid in isopropanol, the additional acid being employed to enhance the color of the indicia to be formed in the next coating. The coated sheet was then dried for 4 minutes at 120° C.

A photosensitive coating solution was made by mixing together

|  | Parts |
| --- | --- |
| 59.8% solids soya alkyd resin in xylene and methyl cellosolve | 3.5 |
| 75.8% solids alkylated melamine resin in butanol and xylene | 3.0 |
| 40% para-toluene sulfonic acid in isopropyl alcohol | 0.4 |
| Coupler (Dionol Purple) | 0.6 |
| Diazonium salt | 0.5 |
| Equal weights of methyl alcohol, methyl ethyl ketone and methyl cellosolve | 10. |

This solution was coated with the wire-wound rod over the clear layer described above to a wet thickness of about 25 micrometers. After 4 minutes at 120° C., the dried coating was exposed for 15 seconds to ultraviolet radiation (MP400T5 Sylvania lamp) at a distance of 29 cm through an ultrafiche positive held in close contact with the dried coating. An image was developed by exposure to NH$_4$OH vapor at 70° C. for one minute. The image consisted of a legend of 12 alphanumeric characters which were 20 micrometers high. The legend repeated every 40 micrometers vertically and every 250 micrometers horizontally to the legend.

After 5 minutes at 120° C. and 20 minutes at 140° C. in an oven to cure the resin and then peeling off the carrier, the image-bearing sheet was comminuted in a Wiley mill equipped with a 20-mesh screen (840-micrometer openings). This produced microparticles having a uniform thickness of about 140 micrometers and a maximum dimension parallel to the flat surfaces of about 100–800 micrometers. The complete legend appeared several times on each microparticle of average size and was readable at 140X magnification, thus providing a repetitive code. Readability was improved by immersing the particles in a clear liquid such as isopropanol.

EXAMPLE 2

A 6-layer organic sheet was made as in Example 1 except that the base resin of the sixth layer contained 2.5 parts of the 40% para-toluene sulfonic acid. The color sequence was fluorescent green-orange-magnetic black-green-white-yellow.

A photosensitive coating solution was made by mixing, in the sequence listed, with stirring:

| Part A | 4.1 parts | of 55% solids alkylated melamine resin in butanol and xylene |
| --- | --- | --- |
|  | 4.1 parts | of 50% solids soya alkyd resin in xylene |
|  | 0.4 part | of 40% para-toluene sulfonic acid in isopropanol |
| Part B | 10.0 parts | of 1/1/1 methyl ethyl ketone/ methanol/cellosolve |
|  | 0.1 part | of 40% para-toluene sulfonic acid in isopropanol |
|  | 0.6 part | coupler (Dinol Purple) |
|  | 0.5 part | diazonium salt |
| Part B was added to Part A with stirring. | | |

This solution was coated with a wire-wound rod (#4 Mayer bar) over the yellow layer to a wet thickness of about 16 micrometers. After drying 3 minutes at 120° C., the dried coating was exposed for 10 seconds to ultraviolet radiation as in Example 1. Exposure to NH$_4$OH vapor at 60° C. for one minute developed an image, and the sheet was then heated for 4 minutes at 120° C. After applying the unpigmented resin base of the first five layers over the image to a wet thickness of 25 micrometers, the sheet was heated for 15 minutes at 120° C. After peeling off the carrier, the sheet was heated for 8 hours at 140° C. It was then comminuted in a Wiley mill equipped with 20-mesh screen.

The identifying indicia of the resultant microparticles were more uniform and easier to read than the microparticles of Example 1.

EXAMPLE 3

An organic sheet was made as in Example 1 to provide a color sequence of fluorescent green-white-magnetic black-orange-white-orange. A photosensitive coating solution was prepared by mixing 28 parts of a 25% solution of phenol-formaldehyde resin (BKR 2620, Union Carbide) in methyl ethyl ketone, 2.8 parts of diazo oxide [naphthoquinone-(1,2)-diazide-(2)-5-sulfonic acid-4-(t-butylphenyl)ester] and 0.12 part of blue dye. The diazo solution was coated over the orange surface layer with a wire-wound rod (#7 Mayer bar) and dried at 100° C. for two minutes to a thickness of about 0.2-0.3 micrometer. The dried coating was exposed to ultraviolet radiation through the same ultrafiche positive as in Example 1 using a Grafarc automatic reflector arc lamp, Type 32500-3, manufactured by Strong Electric Corporation. The arc was 117 cm from the coating, and the exposure was 150 seconds. The image was developed by rubbing the sample with sodium metasilicate solution.

After 120° C. for three hours in the oven, the polyester carrier was peeled away from the sheet of colored organic layers. The sheet, which was 100 micrometers in thickness, was comminuted in a Wiley mill equipped with a 20-mesh screen to produce microparticles, nearly all having at least one complete legend which was readable at 140X magnification.

EXAMPLE 4

The ultrafiche used in Examples 1 and 2 was used to contact-print a high resolution plate (Kodak High Resolution Plate Type 1A) which was developed and then bleached (Kodak R-10 bleach) to convert the silver images to silver bromide images in relief. Room-temperature-vulcanizing silicone mold-making polymer (Dow Corning "Silastic" RTV) was cast onto the silver bromide relief to form a replication of the relief.

The alkylated melamine resin of Example 1 catalyzed with para-toluene sulfonic acid was cast onto the replication to a wet thickness of about 250 micrometers. The coating thickness was controlled using an adjustable knife coater. This coating was partially cured at 80° C. for 10 minutes. A second coating, identical to the first except comprising about 50% by weight of solids of iron powder, was likewise cast to a thickness of 250 micrometers. The whole was cured at 140° C. for 10 minutes. Total thickness of the two cured coatings was 125 micrometers.

The two-coating casting was removed from the silicone polymer and comminuted in a Wiley mill. The resulting microparticles were observed under a 100X microscope using incident illumination, and a number of the legends were easily legible on each typical microparticle of average size.

I claim:

1. In a batch of organic microparticles which are uniformly encoded for retrospective identification, each of the same thickness not significantly exceeding 500 micrometers and having two surfaces which are generally flat and parallel to each other across its broadest dimension, the broadest dimension of most of the microparticles being no greater than 1000 micrometers but greater than said thickness, the improvement comprising:
    at least one of the flat surfaces of each microparticle bears identifying indicia selected from alphanumerics and symbols which provide a repetitive code that (a) is randomly located with respect to the edges of the microparticle, (b) can be visually interpreted under magnification, and (c) repeats in any direction within a distance less than said broadest dimension so that examination of a typical microparticle of average size should reveal said code.

2. In a batch of microparticles as defined in claim 1, the further improvement comprising:
    said indicia include alphanumerics.

3. In a batch of microparticles as defined in either claim 1 or claim 2, the further improvement comprising:
    said identifying indicia are protected by a transparent layer.

4. In a batch of microparticles as defined in claim 1, the further improvement comprising:
    each microparticle is further encoded by a plurality of visually distinguishable colored layers across said other surfaces.

5. In a batch of microparticles as defined in claim 1, the further improvement comprising:
    each microparticle includes luminescent material which helps to locate the microparticle.

6. In a batch of microparticles as defined in claim 1, the further improvement comprising:
    each microparticle includes magnetic material which helps to locate the microparticle.

7. In a batch of microparticles as defined in claim 1, the further improvement comprising:
    each microparticle is further encoded by including a plurality of magnetic materials having differing Curie point temperatures.

8. In a batch of microparticles as defined in claim 1, the further improvement comprising:
    each microparticle is further encoded by including a plurality of phosphors exhibiting differing specific emission patterns.

9. In a batch of microparticles as defined in claim 1, the further improvement comprising:
    each microparticle is further encoded by including a plurality of tagging elements at a plurality of concentrations decodable by electron microprobe analysis.

10. In a batch of microparticles as defined in claim 1, the further improvement comprising:
    the organic material is a brittle, crosslinked organic resin.

11. In a batch of microparticles as defined in claim 1, the further improvement comprising
    said repetitive code repeats in any direction within a distance approximating the thickness of the microparticles.

12. Method of making a batch of microparticles useful for retrospective identification comprising the steps of:
   (1) making an organic sheet of substantially uniform thickness not significantly exceeding 500 micrometers,
   (2) forming on at least one face of the sheet identifying indicia selected from alphanumerics and symbols which provide a repetitive code that can be visually interpreted under magnification and repeats in any direction within a distance not significantly exceeding 500 micrometers, and
   (3) comminuting the sheet at random into a batch of microparticles, each having two surfaces which are generally flat and parallel to each other and contain portions of said indicia, the broadest dimension of most of the microparticles being no greater than 1000 micrometers, but greater than said distance so that examination of a typical microparticle of average size should reveal said code.

13. Method of making a batch of microparticles as defined in claim 12, including the additional step between steps (2) and (3) of applying a transparent protective layer over the identifying indicia.

14. Method of making a batch of microparticles as defined in claims 12 or 13 wherein step (2) comprises forming said identifying indicia on both faces of the sheet so that the indicia can be interpreted under magnification of said typical microparticle without substantially turning the microparticle.

15. Method of making a batch of microparticles as defined in claim 12 wherein step (1) includes uniformly incorporating into the sheet a further code which can be retrospectively identified by examination of a typical microparticle created in step (3).

16. Method of making a batch of microparticles as defined in claim 15 wherein said further code is provided by making said sheet of a plurality of visually distinguishable colored organic layers.

17. Method of tagging a substance for retrospective identification comprising incorporating with a substance a plurality of microparticles from a batch as defined in claim 1.

18. Method of tagging a substance as defined in claim 17 comprising incorporating with the substance a plurality of microparticles from each of two differently encoded batches as defined in claim 1.

19. Method of tagging a substance as defined in claim 18 wherein the indicia of the microparticles from one batch identify the source of the substance and the indicia of the microparticles from the other batch identify individual units of production.

20. Method of tagging a substance as defined in claims 17 or 18 wherein the substance is the hide of an animal.

* * * * *

UNITED STATES PATENT AND TRADEMARK OFFICE
CERTIFICATE OF CORRECTION

PATENT NO. : 4,390,452
DATED : June 28, 1983
INVENTOR(S) : Edward J. Stevens

It is certified that error appears in the above-identified patent and that said Letters Patent is hereby corrected as shown below:

Column 5, line 1, "4" should read --14--.

Signed and Sealed this

Fifteenth Day of November 1983

[SEAL]

Attest:

GERALD J. MOSSINGHOFF

*Attesting Officer*  *Commissioner of Patents and Trademarks*